United States Patent [19]

Clark et al.

[11] Patent Number: 5,040,662

[45] Date of Patent: Aug. 20, 1991

[54] CONTAINER ERECTING SYSTEM

[75] Inventors: Arthur C. Clark, Madera; Dennis E. Schramm, Fresno; Christopher L. Codde, Madera, all of Calif.

[73] Assignee: FMC Corporation, Chicago, Ill.

[21] Appl. No.: 540,987

[22] Filed: Jun. 20, 1990

[51] Int. Cl.⁵ ............................................. B65G 47/24
[52] U.S. Cl. .................................... 198/408; 198/413; 198/461
[58] Field of Search ............. 198/408, 413, 461, 478.1

[56] References Cited

U.S. PATENT DOCUMENTS

| | | | |
|---|---|---|---|
| 2,193,942 | 3/1940 | Shackelford | 198/408 |
| 2,538,408 | 1/1951 | Baker et al. | 198/408 |
| 2,656,033 | 10/1953 | Olson et al. | 198/408 |
| 3,426,884 | 2/1969 | Donner | 198/408 X |
| 4,213,526 | 7/1980 | Graham et al. | 198/408 |
| 4,960,198 | 10/1990 | Wilhelm | 198/461 X |

Primary Examiner—Robert J. Spar
Assistant Examiner—James Keenan
Attorney, Agent, or Firm—A. J. Moore; R. C. Kamp; R. B. Megley

[57] ABSTRACT

A method and apparatus is disclosed for transferring cylindrical articles such as glass or metal containers from a position supported on their cylindrical surfaces to a position supported on one of their flat ends. The apparatus includes an intermittently driven feed conveyor for feeding containers between stationary guides which positions the flat ends of containers upon a pair of narrow flat belts trained around annuluses secured to a driven starwheel having equally spaced carriers thereon which move between the guides and push the containers onto a linear upper run of the belts which are driven at a higher arcuate speed than the annuluses for assuring the upper ends of the carriers do not contact and cause the containers to be dislodged from their flat surfaces.

20 Claims, 3 Drawing Sheets

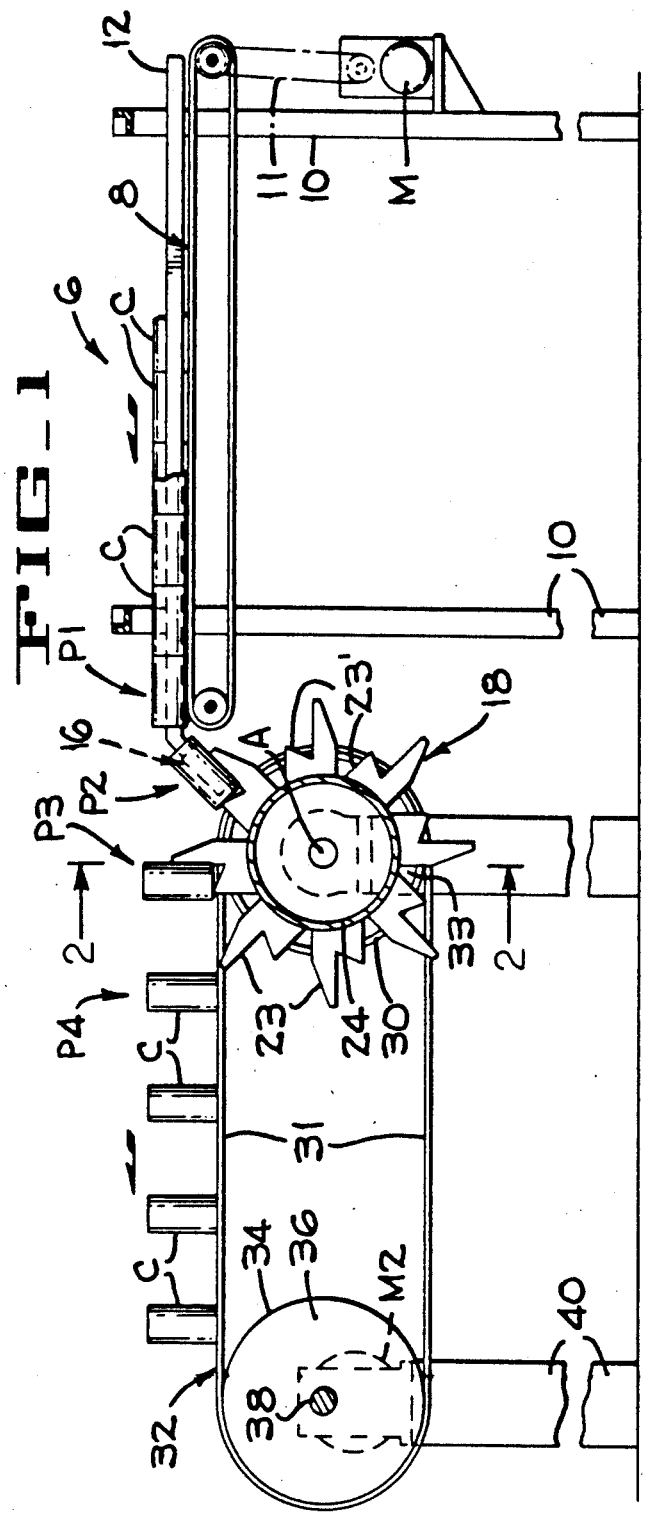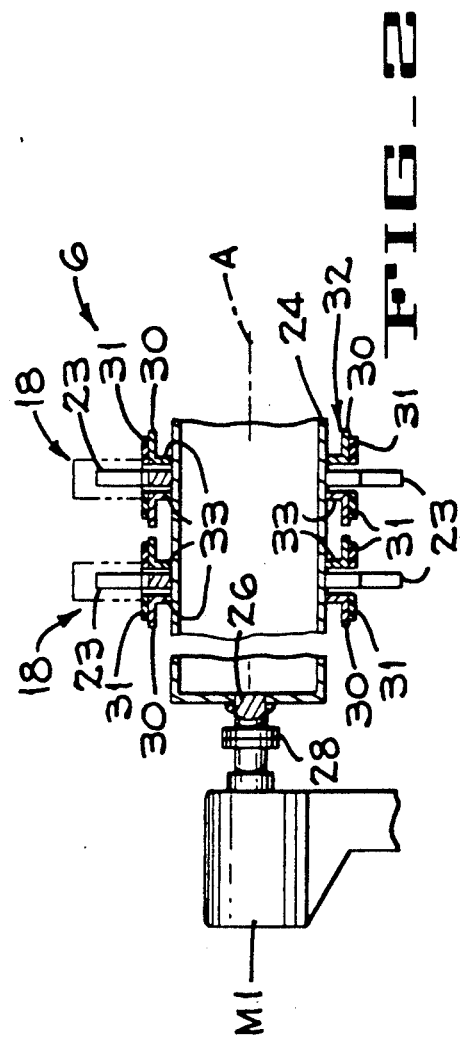

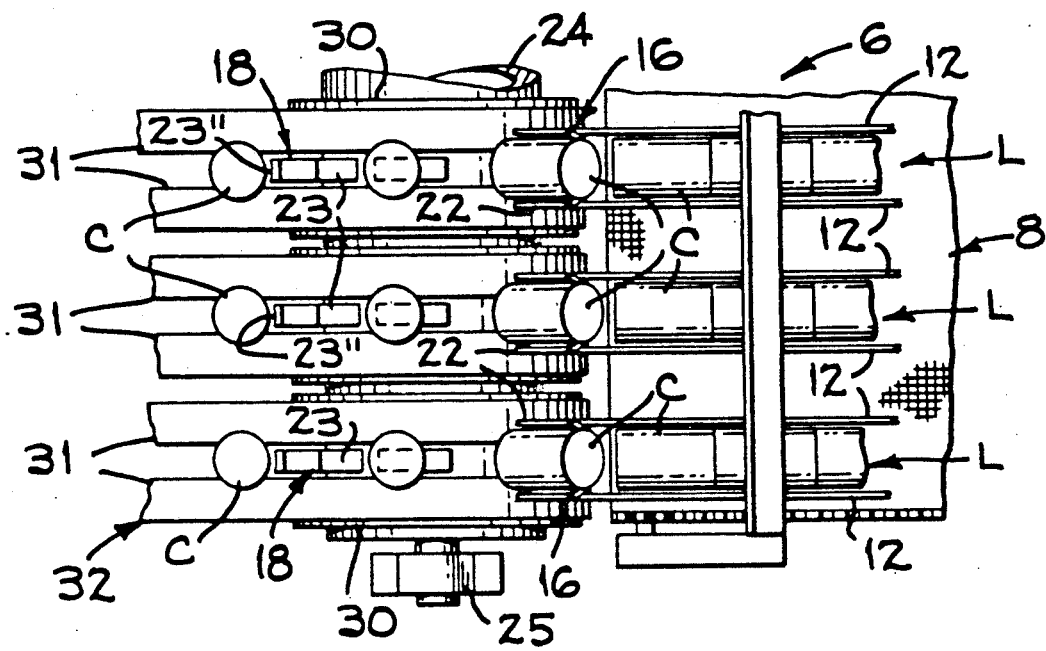
FIG_3
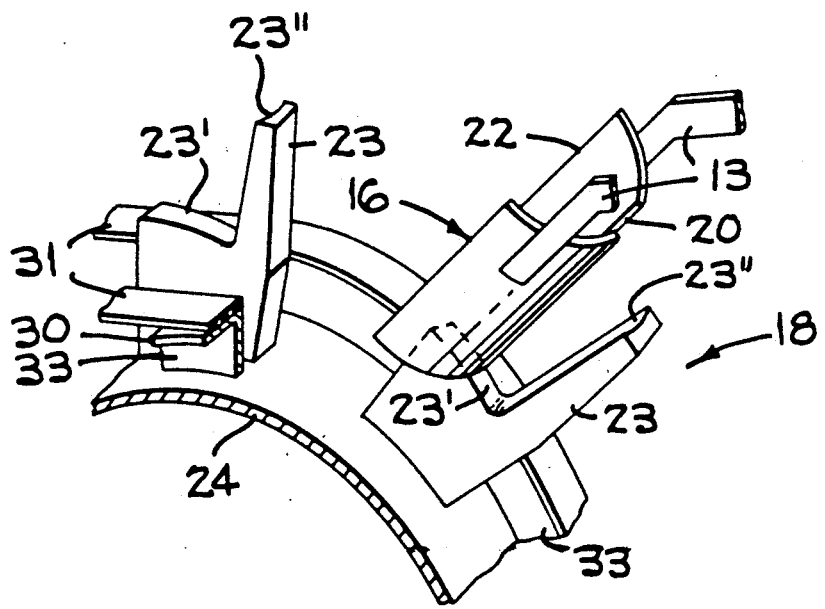
FIG_4

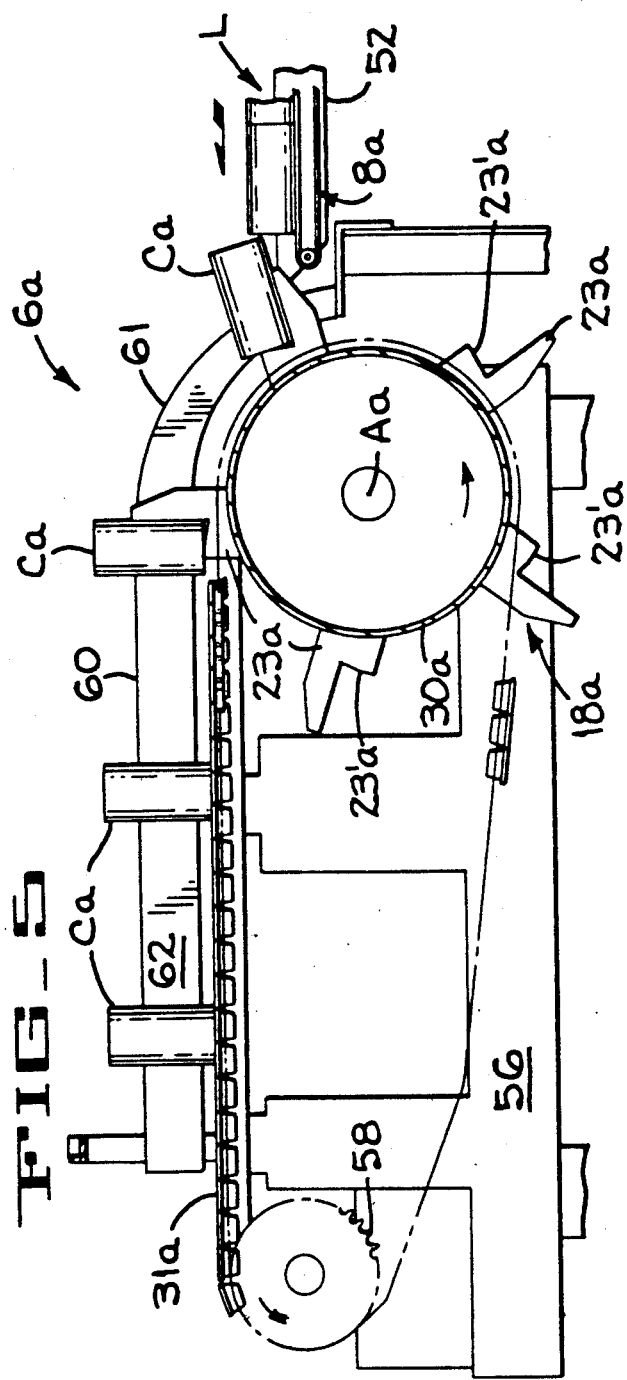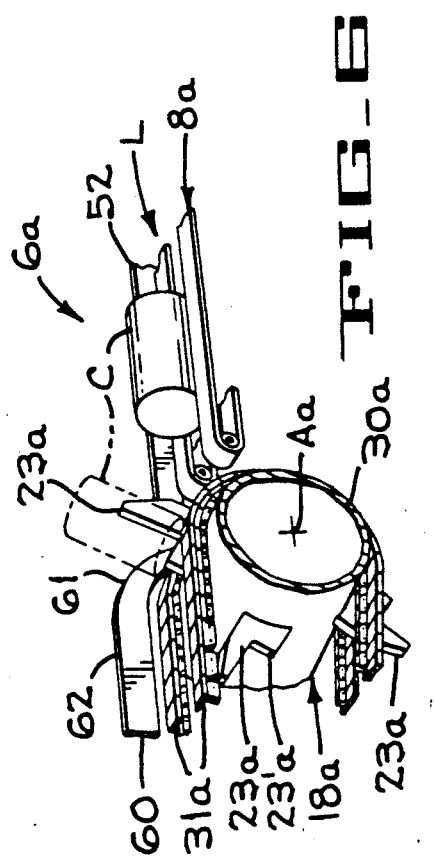

CONTAINER ERECTING SYSTEM

BACKGROUND OF THE INVENTION

Field of the Invention

The present invention relates to a method and apparatus for reliably and continuously transferring containers such as jars, cans, and other cylindrical articles having at least one flat end from a horizontal position to an upright position on one end for storage and packaging, or the like.

SUMMARY OF THE INVENTION

The container erecting system of the present invention receives cylindrical containers having at least one substantially flat end surface. A row, or a plurality of rows, of containers are supported on their cylindrical surfaces on an intermittently driven feed conveyor and conveys the containers into a driven container erecting star wheel having evenly spaced container engaging carriers which guide the containers onto a spaced pair of driven endless belts of a take-away conveyor, which belt and starwheel rotate about a common axes, thus eliminating the need for a "dead plate". The co-axial starwheel and take-away conveyor eliminates container handling problems which would otherwise occur when transferring across "dead plates".

BRIEF DESCRIPTION OF THE DRAWINGS

FIG. 1 is a diagrammatic elevation with parts broken away illustrating a first embodiment of the article erecting system.

FIG. 2 is a section taken along lines 2—2 of FIG. 1.

FIG. 3 is a diagrammatic plan view of a portion of the container erecting system of the present invention illustrating three rows of containers.

FIG. 4 is a perspective illustrating a stationary two piece chute for transferring a cylindrical article from a feed conveyor to a pair of spaced belts by carriers of a starwheel.

FIG. 5 is a side view with parts cut away of a second embodiment of the invention that is similar to FIG. 1 except that the two piece arcuate chute is omitted.

FIG. 6 is a perspective of a portion of a feed conveyor, a starwheel, and one of a pair of side guides.

DESCRIPTION OF THE PREFERRED EMBODIMENT

Although the preferred use of the container erecting system of the present invention is primarily intended for use on containers, it will be understood that the system may be used to reliably erect other cylindrical articles having at least one flat end from a position supported on their cylindrical surfaces to a position supported on their flat ends.

The preferred function to be performed by the container erecting system 6 of the present invention is to receive sealed jars or cans which have been sterilized and cooled by hydrostatic sterilizers (not shown).

The container erecting system 6 (FIGS. 1 and 2) of the present invention is intended for use with containers C such as glass jars of different lengths, for example, 1½" to 5" tall, and also cylindrical cans of different lengths, each of which have at least one end surface which is substantially flat, hereinafter referred to as "flat end".

The first embodiment of the container erecting system 6 of the present invention (FIGS. 1 and 2) includes an intermittently driven chain mesh feed conveyor 8 which is supported on a frame 10 and is intermittently driven by a conventional variable speed gear motor M and a conventional index drive 11. A plurality of spaced parallel guide bars 12 define lanes L for spacing rows of end-to-end containers C from each other. The rows of containers C are supported on their cylindrical surfaces when on the feed conveyor 8, which conveyor advances the foremost ones of the containers through associated two-piece arcuate chutes 16 as illustrated which are angled forwardly and downwardly and are connected to the associated guide bars 12 by straps 13 (FIG. 4) for guiding the flat ends of the containers onto an associated one of a plurality of starwheels 18. Each chute 16 has a narrow opening 20 (FIG. 4) in its lower surface and a large opening 22 which is larger than the diameter of the containers C to allow the containers to be conveyed through the large opening.

Each starwheel 18 includes a plurality of evenly spaced narrow carriers 23 having a step 23' which are positioned to pass through the opening in the chute 16. The carrier steps 23' maintain the lower flat ends of the container C off the narrow flat belts 31 of a take-away conveyor 32 until the containers move beyond a vertical plane containing the centerline or axis A (FIG. 1). Each starwheel 18 is rigidly secured on a relatively large diameter mounting tube 24 (FIG. 2) which is journaled by bearings 25 (only one being shown) and is driven about an axis A in the direction indicated by the arrows in FIG. 1 by a variable speed gear motor M1 connected to a stub shaft 26 by a coupling 28. Two flat belt annuluses 30 have the narrow flat belts 31 trained therearound. The annuluses 30 are concentric with and rigidly secured to the periphery of the tube 24 by support members 33 with the carriers 23 having arcuate container engaging surfaces 23" disposed therebetween as best shown in FIG. 4.

The discharge ends of the narrow flat belts 31 are trained around a tube (FIG. 1) 34 that has a rough belt driving surface, whereas the surface of the flat-belt annuluses 30 have smooth surfaces, which smooth surfaces permit the discharge belts 31 to slide on the annuluses.

The tube 34 includes end plates 36 which are secured to stub shafts 38 that are journaled in bearings (not shown) in a suitable frame 40. One of the stub shafts 38 is connected to a variable speed gear motor M2 which is similar to the motor M1 (FIG. 2).

The three motors M, M1 and M2 may include computer control gear boxes (not shown) to vary the speed of the feed conveyor 8, the starwheel 18, and the flat belts 31.

In operation, a plurality of articles having cylindrical surfaces and at least one substantially flat end, for example glass jars or cans which may be arranged in batches of different sizes. The containers C are arranged into lanes between guide bars 12 and are intermittently indexed by the feed conveyor 8 into a first position P1 (FIG. 1) in each lane ready to be advanced into an associated arcuate chute 16 at position P2. A continuously driven carrier 23 having a carrier step 23' in each lane then moves the associated container from position P2 to a position beyond position P3 and then lower the supported container C onto the flat belts. The uppermost carriers in each lane move along an arcuate path, not in a linear path of the associated pair of narrow flat belts 31 of the take-away conveyor. Accordingly, the carriers 23 will not contact and tilt the container off of its flat bottom because the narrow flat belts are driven at a speed faster than that of the peripheral speed of the annuluses 30 and because the containers C are deposited on the narrow flat belts between positions P3 and P4. Therefore, the pairs of narrow flat belts of the discharge conveyor 31 are driven at a speed of about two feet per minute faster than said feed conveyor 8 thus causing the containers at position P3 to move forward and away from the top of the uppermost carrier 23 between position P3 and P4 which avoids contact as illustrated at position P4 (FIG. 1). Thus, the containers C remain supported on their flat ends in upright position and are then moved by the pair of narrow flat belts 31 either to storage or to a packaging machine or the like.

Although the operation has been described as though the apparatus of the present invention included only one lane, it will be understood that a plurality of lanes, for example 40 lanes, of containers are reliably erected rom a position on their cylindrical surfaces to a position on their flat ends.

A second embodiment of the container erecting system 6a of the present invention is illustrated in FIGS. 5 and 6 and is similar to the first embodiment except that the two-piece arcuate chute 16 (FIGS. 1 and 4) is omitted, and the containers Ca (FIGS. 5 and 6) are intermittently fed into a starwheel 18a by a feed conveyor 8a (FIG. 2)(not fully shown). The feed conveyor is similar to the feed conveyor 8 of the first embodiment except that the container supporting plane of the feed conveyor 8a is lowered to a level between that of a horizontal plane passing through the axis Aa (FIG. 5) of a starwheel 18a and the level illustrated by container supporting surfaces of the feed conveyor 8a. Vertical container guide plates 52 (FIG. 6—only one being shown) separate up to about forty rows of containers into lanes L, only a portion of one being shown in FIG. 6.

The second embodiment also includes at least one starwheel 18a which is journaled on a frame 56 for rotation about the axis Aa in the direction of the arrow by a motor (not shown). The starwheel 18a has a plurality of evenly spaced carriers 23a thereon which project outwardly from the axis Aa. Each carrier 23a includes a step 23a' which receives the substantially flat bottom of the supported containers Ca.

As in the first embodiment of the invention, means defining a pair of annuluses 30a (FIG. 6) are formed on opposite sides of the starwheel 18a, are concentric with the axis Aa of the starwheel, and are continuously driven by a motor (not shown). A pair of narrow cog-belts 31a are trained around drive sprockets 58 (FIG. 5) (only one being shown) and are driven at a speed of about two feet per minute faster than the tangential speed of the starwheel annuluses 30a causing the faster driven cog-belts 31a to slip on the annuluses 30a. A pair of side guides 60 (only one being shown) having arcuate end sections 61 secured to the frame 56 (FIG. 5) and include linear portions 62 which guide the containers Ca while being fed onto the continuously driven starwheel carriers 23a against the carrier steps 23a. The movement of the driven starwheel carriers 23 then advances the containers Ca upwardly past the vertical plane of the centerline Aa before the steps 23a' of the carriers move below the upward linear runs of the cog-belts thereby transferring the containers Ca onto the pair of cog-belts 31a for advancement away from the upper ends of the carriers 23a due to the faster speed of the cog-belts 31a. During transfer of the containers Ca onto the carriers 23a and release of the containers from the starwheel carriers, the containers are guided by the pair of side guides 60.

Although the operation of both embodiments of the invention has been discussed as though both apparatus of the present invention includes only one lane, it will be understood that a plurality of lanes, for example 40 lanes, of containers are reliably erected from a position on their cylindrical surfaces to a position on their substantially flat ends.

From the foregoing description it is apparent that the method and apparatus of the present invention eliminates the need for "dead plates" at container transfer and erecting points which frequently cause container handling problems resulting in container damage, or other handling problems which require extra maintenance time and expense.

Although the best mode contemplated for carrying out the present invention has been herein shown and described, it will be apparent that modification and variation may be made without departing from what is regarded to be the subject matter of the invention.

What is claimed is:

1. An apparatus for transferring articles each having a cylindrical surface and at least one flat end from a position supported on said cylindrical surface to a position supported on said at least one flat end, comprising:

first conveying means for conveying the articles while supported on said cylindrical surface along a linear path;

means defining a driven starwheel having a plurality of evenly spaced carriers thereon and having concentric belt receiving annuluses on opposite sides of said carriers;

means defining a spaced pair of narrow endless conveyors trained around said belt receiving annuluses and having both arcuate and linear runs;

means for guiding the article from support on its cylindrical surface to support on one of said carriers when moving around an arcuate portion of said pair of conveyors, and second conveying means for driving said spaced pair of endless conveyors at a speed faster than the speed of said annuluses for moving said article away from said one carrier which contacts and moves said article onto container supporting linear runs of said second conveyor means and away from said one spaced carrier.

2. An apparatus according to claim 1 wherein said evenly spaced carriers each include a container supporting step for maintaining the articles spaced from said narrow endless belts when moving around a portion of said arcuate runs and thereafter lowering said at least one flat end of the articles on said pair of endless conveyors.

3. An apparatus according to claim 1 wherein said first conveyor means is an intermittently driven conveyor.

4. An apparatus according to claim 1 wherein said means for guiding the article is a two piece arcuate chute having a narrow slot therein that is wide enough to allow said carriers of said starwheel to pass therethrough, and a wide slot therein for allowing both the article and said carrier to pass therethrough.

5. An apparatus according to claim 4 wherein said first conveying means includes a linear surface for supporting the articles at a higher elevation than article supporting surfaces of the linear runs of said spaced pair of narrow endless conveyors.

6. An apparatus according to claim 1 wherein said articles are sealed glass containers which are between 1½" to 5" tall.

7. An apparatus according to claim 1 wherein said articles are filled sealed cans having sterilized products therein.

8. An apparatus according to claim 1 wherein said first conveyor means includes a multi-row intermittently driven feed conveyor and additionally comprising a plurality of spaced parallel guide bars for separating containers into separate columns aligned with associated ones of said starwheels.

9. An apparatus according to claim 8 wherein said first conveyor means, said starwheel means, and said means for driving said spaced pairs of endless conveyors are driven in timed relation under the control of a computer.

10. An apparatus according to claim 1 wherein said first conveyor means for conveying the articles while supported on their cylindrical surfaces includes an article supporting run positioned between a horizontal plane passing through an axis of rotation of said starwheel and a position below the level of said container supporting linear runs of said second conveying means.

11. An apparatus according to claim 1 wherein said means for guiding the articles onto one of said carriers comprises a pair of spaced side guides having arcuate portions extending below the level of an article supporting surface of said first conveying means.

12. An apparatus according to claim 1 wherein an article conveying surface of said first conveying means is positioned between the level of a horizontal plane containing the axis, of rotation of said starwheel and a level lower than said container supporting linear run of said second conveyor means.

13. An apparatus according to claim 11 wherein an article conveying surface of said first conveying means is positioned between the level of a horizontal plane containing the axis of said starwheel and a level lower than said container supporting linear run of said second conveyor means.

14. A method for reliably transferring articles each having a cylindrical surface and at least one substantially flat end, comprising the steps of:
supporting at least one row of said articles on their cylindrical surfaces in abutting contact;
moving said at least one row of abutting articles toward a driven starwheel having a plurality of evenly spaced carriers thereon and concentric annuluses secured thereto on opposite sides of said starwheels;
driving a spaced pair of narrow endless conveyors trained around said concentric annuluses and having linear runs;
transferring a foremost article between spaced stationary guide means on opposite sides of a moving carrier for lifting and guiding said at least one substantially flat end of the article for subsequent placement on said spaced pair of said endless conveyors for conveyance away from said starwheel.

15. A method according to claim 14 and additionally comprising the step of driving said pair of narrow endless conveyors at a peripheral speed greater than that of said annuluses for preventing tips of said carriers from contacting and tilting said containers off of their substantially flat ends when in said linear portion of said narrow endless belts.

16. A method according to claim 14 and additionally maintaining the at least one row of articles when supported on said carriers with said substantially flat end of said at least one article spaced from an arcuate portion of said spaced pair of endless belts when moving around a portion of said concentric annuluses, and thereafter lowering said flat end of said at least one article on said linear runs of said narrow endless conveyors for conveying the articles away from said carriers while supported on said flat end.

17. A method of reliably transferring containers each having a cylindrical surface and at least one substantially flat end from support on said cylindrical surface to support on said flat end comprising the steps of:
supporting at least one row of containers on their cylindrical surfaces when in abutting contact;
moving said at least one row of abutting containers toward a driven starwheel having a plurality of evenly spaced carriers thereon movable in a circular path and having a pair of annuluses concentric with and secured to said starwheel;
training a spaced pair of narrow endless conveyors over said annuluses and along a linear run;
driving said endless conveyor at a peripheral speed faster than the peripheral speed of said annuluses; and
transferring a foremost container in front of said evenly spaced carriers of said starwheel between guide means for guiding said at least one substantially flat end of the foremost container onto said linear portion of said spaced pair of parallel conveyors and thereafter conveying the foremost container away from the starwheel at a speed sufficient to move said foremost container out of the path of movement of said evenly spaced carriers.

18. A method according to claim 17 and additionally comprising the step of maintaining the containers spaced from said narrow endless driven conveyors when supported on said moving carriers of said starwheels for subsequently transferring the containers onto the endless driven conveyors with their flat ends at a location spaced from contact by said carriers.

19. A method according to claim 17 and additionally comprising the step of guiding said containers when supported on said linear portion of said pair of parallel conveyors.

20. A method according to claim 17 wherein said containers are glass containers.

* * * * *